United States Patent [19]
Genton

[11] 3,710,552
[45] Jan. 16, 1973

[54] AIR FILTER AND DUST COLLECTOR

[76] Inventor: Richard G. Genton, 733 South Magnolia Avenue, West Covina, Calif. 91791

[22] Filed: Aug. 27, 1970

[21] Appl. No.: 67,525

[52] U.S. Cl. .......................55/291, 55/300, 55/341
[51] Int. Cl. .............................................B01d 46/04
[58] Field of Search.................55/341, 291, 300, 302

[56] References Cited

UNITED STATES PATENTS

| | | | |
|---|---|---|---|
| 1,743,934 | 1/1930 | Ruemlin | 55/341 X |
| 2,781,104 | 2/1957 | Fischer | 55/341 X |
| 1,286,458 | 12/1918 | Warren | 55/300 |
| 515,767 | 3/1894 | Harmon | 55/341 X |
| 3,394,532 | 7/1968 | Oetiker | 55/302 |

Primary Examiner—Arthur D. Kellogg
Attorney—Forrest J. Lilly

[57] ABSTRACT

A dry air filter and dust collector employing fabric cylinders through which air is drawn from the outside to the inside. The fabric cylinders are tensioned at the bottom and mounted to permit shrinking and stretching of the fabric while maintaining constant tension. At the same time means are provided for applying shaking movements to the bottom of the filter cylinders to remove dust accumulation therefrom. A source of low pressure air for the top of the fabric cylinder may oppose flow of the air to be filtered so that the dust will not be held against the fabric surface thereby.

2 Claims, 4 Drawing Figures

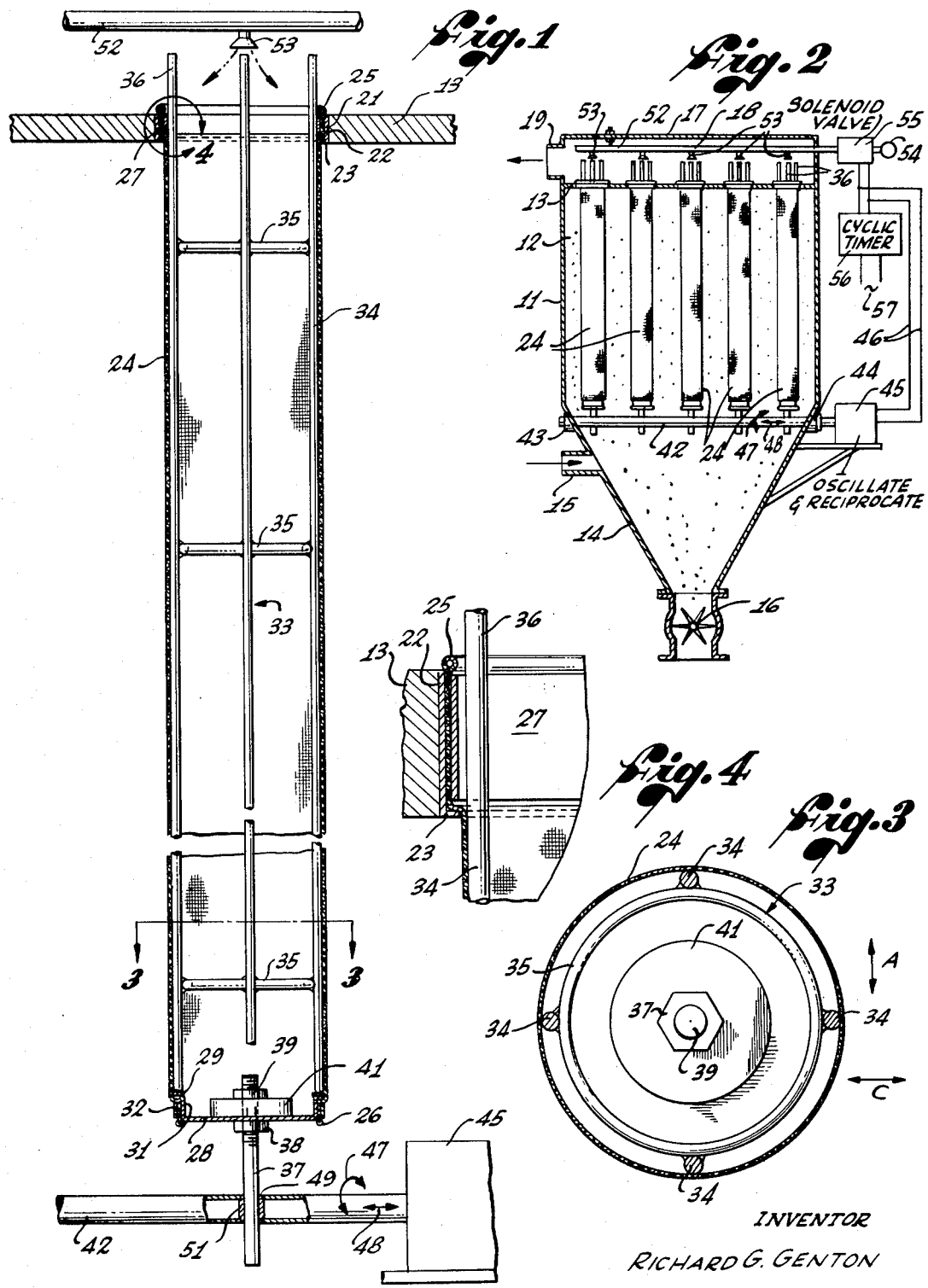

AIR FILTER AND DUST COLLECTOR

BACKGROUND OF THE INVENTION

1. This invention relates to the field of dry air filters and dust collectors utilizing fabric cylinders through which the air to be filtered passes.

2. Dry air filters and dust collectors utilizing elongated fabric cylinders through which the air is filtered in passing from the outside to the inside of the fabric cylinders are known in the art in various constructions in which trapped dust may be periodically removed from the outside of the fabric cylinders either by the use of mechanical shakers or by reversing the flow of air for sufficient time to clean the cylinders.

Reverse flow of air through the fabric cylinder does not efficiently clean the trapped dust from the fabric and greatly reduces the life of the fabric cylinders. Mechanical shaking by various means has also been undesirable in failing to provide for constant tension on the fabric cylinders which also tends to reduce their life. Prior constructions have also been needlessly complex and at least some of them have required replacement of the filter cylinders from the dusty or upstream side thereof.

The above disadvantages are corrected in the air filter and dust collector according to the present invention which simply stops flow of filtering air without substantially reversing its flow and shakes the fabric cylinders to remove the dust trapped thereon while at the same time maintaining constant tension on the fabric cylinders. It provides a mechanical connection to a shaker which permits stretching and shrinking of the fabric while maintaining constant tension thereon.

SUMMARY OF THE INVENTION

The fabric cylinder filters of the air filter and dust collector of the present invention are mounted at their upper ends between annular surfaces tightly engaging the fabric. The fabric extends over an inwardly directed flange at the lower end of the mounting and has a bead at its upper end disposed about the mounting. The lower end of the fabric cylinder is connected in a similar manner to an imperforate pan-shaped disc or plate which seals the bottom end of the cylinder. A rod extends through the bottom plate and mounts a replaceable weight thereabove and has its lower end extending freely through a mechanical operator relative to which the rod may move freely in a vertical direction to permit shrinkage or stretch of the fabric of the cylinder without changing the tension thereon. The mechanical operator through which the rod extends is oscillated through a small angle and also reciprocated to apply compound shaking movements to the bottom end of the fabric cylinder filter. This shaking operation is performed at timed intervals for a row of filter cylinders and at the same time low pressure air may be directed toward the upper ends of the cylinders in that row to block the passage of the air to be filtered through the cylinders. With the filtering air flow stopped, the dust particles are no longer held against the outer surfaces of the filter cylinders and may be readily shaken therefrom. Frameworks for holding the fabric of the filters in cylindrical form are disposed therein and rest upon the bottom closures for the cylinders. Each fabric cylinder is tensioned by the sum of the weights of: the bottom closure, the replaceable weight thereon, the guiding and manipulating rod and its attachments, and the cylindrical frame, to apply a constant tension to the fabric cylinder which is maintained regardless of stretching or shrinking thereof.

The cylindrical frame preferably extends up through and beyond the upper mounting for the fabric cylinder and the closure for the bottom of the fabric cylinder is sized to a dimension such that it will pass through the flange on the fixed annular part of the mounting for the top of the fabric cylinder whereby the cylinder may be withdrawn from the filter and collector through the top opening and therefore manipulated and replaced from the downstream or clean side of the filter and collector.

An improved and simplified construction is provided in which the flow of air through the fabric cylinder filters may be substantially stopped without reversal thereof and in which the bottom of the filter cylinder may be shaken while still permitting free vertical movement of the cylinder bottom, under constant tension, to allow for shrinkage and stretch in the fabric of the cylinder.

Other objects and features of the invention will be apparent from the detailed description.

DESCRIPTION OF THE DRAWINGS

FIG. 1 is a vertical sectional view through one of the fabric cylinder filters of the air filter and dust collector of this invention.

FIG. 2 is a generally diagrammatic sectional view through the air filter and dust collector of this invention.

FIG. 3 is an enlarged transverse sectional view on the line 3—3 of FIG. 1.

FIG. 4 is an enlarged detail view of the top mounting of a fabric cylinder taken within the circular arrow 4 of FIG. 1.

DESCRIPTION OF THE PREFERRED EMBODIMENT

The exemplification of the air filter and dust collector of this invention illustrated in FIG. 2 comprises an enclosure 11 forming a filter chamber 12 closed at the top by a wall 13 and at the bottom by one or more hoppers 14. Hopper 14 has an inlet 15 for dust laden air and a dust outlet feed rotor 16 also providing an air lock from the hopper 14. The enclosure 11 extends above the upper wall 13 as at 17 to form a clean air chamber 18 with an air outlet 19. The upper wall 13 has a plurality of transversely and longitudinally aligned holes 21 therethrough, of which five are shown in FIG. 2 in a transverse row.

Referring to FIGS. 1 and 4, in the hole 21 therein shown there is press fit or welded an annular member 22 having a lower internally directed rib or flange 23. A cylindrical fabric filter 24 has horizontal beads 25 and 26 at its opposite ends formed by the edge of the fabric cylinder being sewn over a length of cord in known manner. The upper end of the fabric cylinder 24 is located inside the annular member 22 and extends over the rib 23, as shown more particularly in FIG. 4. A resilient clamping ring 27 is mounted inside the upper end of the fabric cylinder 24 to clamp the fabric cylinder between itself and the annular member 22, with the bead 25 disposed above the annular member 22 and the resilient clamping ring 27.

The bottom of the fabric cylinder 24 is closed by a pan-shaped plate 28 having an outwardly extending flange 29 over which the bottom end of the fabric cylinder 24 extends to place the bead 26 just below the surface of the pan-shaped member 28. The pan 28 has an upwardly extending portion 31 between its flat bottom surface and the flange 29 and a resilient clamping ring 32 is disposed about the bottom portion of the fabric cylinder 24 to clamp it tightly against the upstanding portion 31 on the pan-shaped plate 28.

The interior of the fabric cylinder 24 is held outwardly in cylindrical form by a framework indicated generally at 33, FIGS. 1 and 3, and comprising a plurality of vertically extending rods 34 held together in circumferentially spaced relation by vertically spaced rings 35 welded thereto. The lower ends of the rods 34 rest on the flanges 29 of the bottom closing plate 28 and their upper ends extend through the holes 21 into the position shown at 36, above the upper wall 13. Alternatively, the vertically spaced rings 35 may be sewn to the inside of the fabric cylinder 24 and the rods 34 omitted.

A cylinder shaking rod 37 is threaded in a hole in the center of the pan-shaped closing plate 28 and locked by a pair of nuts 38 and 39 threaded thereon. Between the nut 39 and the upper surface of the plate 28 is disposed a replaceable weight 41 in the form of a disc with a center hole through which the rod 37 extends. This weight 41 is readily interchangeable with weights of different values to secure the desired tension on the fabric cylinder 24.

Beneath each transverse row of fabric cylinders 24 is mounted an operating tube 42 journaled in opposite side bearings 43 and 44 on the enclosure. One end of the tube 42 extends into an oscillating and reciprocating device 45 having electric motor means, not shown, energized over the wires 46 to effect both short oscillating and reciprocating movements of the tube 42, indicated by the arrows 47 for oscillation and 48 for reciprocation. Beneath each rod 37 depending from a fabric cylinder 24 and the tube 42 is provided with a hole 49 extending therethrough in which is placed a guide sleeve 51 through which the rod 37 freely extends to permit vertical movement of the rods 37 relative to the tubes 42 and the enclosure.

Within the chamber 18 above the upper wall 13 of the filter chamber 12, an air pipe 52 extends above each transverse row of holes 21 and above each hole 21 is mounted a generally conical nozzle 53 for directing a stream of low pressure air toward each hole 21 to prevent passage of the air to be filtered therethrough but without substantial reversal of the direction of flow. Each air pipe 52 is connected to a header 54 for low pressure air, through a solenoid valve 55. The valve 55 and the oscillator and reciprocator 45 in each vertically spaced pair of air pipe 52 and operating tube 42 are periodically energized at the same time through a cyclic timer 56 from a source 57.

In the operation of the air filter and dust collector of this invention, dust laden air enters the inlet 15 and moves upwardly into the chamber 12 whence it passes through the fabric cylinders 24 from the outside to the inside thereof. This separates the dust from the air, leaving the dust on the outside surfaces of the fabric cylinders. The clean air moves upwardly inside the fabric cylinders to the chamber 18 whence it exits through the outlet 19.

Each fabric cylinder 24 is loaded or tensioned by the summation of the weights of: the bottom sealing plate 28, the clamping annulus 32, the interior frame 33, the rod 37, the weight 41, and the nuts 38 and 39. Each rod 37 is free to move vertically within its guide sleeve 51 and as the fabric of the cylinder 24 stretches or contracts from temperature, humidity, and the like, the rod 37 moves freely in a vertical direction, thus maintaining constant tension on the fabric cylinder 24.

Periodically, cyclic timer 56 energizes the solenoid valve 55 and the oscillator and reciprocator 45 for a vertically spaced pair of air pipe 52 and operating tube 42. Low pressure air then emerges from the conical nozzle 53 to stop flow of the air to be filtered through the transverse row of fabric cylinders 24 corresponding to the air pipe 52 whose solenoid valve is energized, and the dust on the outside surfaces of the fabric cylinders in that row is therefore no longer held against the surfaces of the cylinders by the filtering air passing therethrough. The manipulating tube 42 is oscillated and reciprocated by the mechanism 45, whose motor is energized at the same time as the solenoid valve 55, thereby applying compound shaking movements to the rod 37 and therefrom to the bottom of the fabric cylinder 24. These shaking movements are both transversely to the plane of the drawing, due to the oscillations of the tube 42, and also in the plane of the drawing, longitudinally of the manipulating tube 42, due to the reciprocating movements applied thereto. This shaking of the bottom of the fabric cylinder 24 while the filtering air is prevented from passing therethrough effectively and efficiently shakes the dust loose from the outer surface of the fabric cylinder and it drops into a hopper 14 from which it may be fed, as desired, by the rotor 16.

When the cyclic timer 56 terminates the energization the solenoid valve 55, it closes to end air flow through nozzle 53 and to permit resumption of flow of air to be filtered. At the same time the motor of the oscillating and reciprocating mechanism 45 is de-energized and the bottoms of the fabric cylinders 24 become quiescent. Normal filtering operation is resumed with the air being filtered passing freely from the outside to the inside of the fabric cylinders 24 to the chamber 18 and outlet 19, leaving the dust on outside surfaces of the fabric cylinders 24 where it either drops into a hopper 14 or is held on the outer surfaces of the cylinders.

It is therefore seen that the air filter and dust collector of the present invention provides an improved mounting and supporting means for the fabric cylinder filters which maintains constant tension on the fabric regardless of any shrinkage or stretching thereof, and in which the flow of filtering air through a row of fabric cylinders is inhibited without substantial reversal of flow and at the same time the bottoms of the cylinders in that row are shaken to remove surface dust therefrom. The structure results in improved operating efficiency and prolonged life of the fabric filters and while a preferred embodiment of the invention has been specifically illustrated and described it will be understood that the invention is not limited thereto as many variations will be apparent to those skilled in the art and the invention is to be given its broadest interpretation within the terms of the following claims.

I claim:

1. An air filter and dust collector comprising:
an enclosure providing a chamber of dust laden air;
an inlet for dust laden air into said chamber;
a closure for the top of said chamber having a plurality of openings therethrough;
a plurality of fabric cylinder filters suspended in said chamber and providing for passage of air to be filtered from said chamber through said fabric cylinder filters to substantially remove the dust from the air and for movement of the clean air longitudinally of the cylinder filters and through said openings;
a collection chamber for clean air above said closure and the openings therethrough;
an air outlet from said clean air chamber;
shaking rods rigidly connected to the bottoms of said fabric cylinder filters extending vertically therebeneath for applying shaking movements thereto to remove trapped dust from the surfaces thereof;
means for loading said fabric cylinder filters with a predetermined vertical tension; and
operating means extending across a plurality of said cylinder filters beneath the bottoms thereof, said operating means have holes therethrough receiving said rods for free vertical movement relative thereto whereby the operating means may transmit transverse shaking movements to said rods and cylinders bottoms while permitting free movement of the cylinder bottoms and rods in a vertical direction relative to said operating means, and so that predetermined constant tension is maintained regardless of shrinking or stretching of the fabric of the cylinder.

2. The air filter and dust collector defined in claim 1 including:
means for applying short oscillating and reciprocating movements to said operating means to be transmitted transversely to said rod.

* * * * *